May 15, 1956     J. S. MICHIE     2,745,291

EXPANSIBLE V-PULLEY

Filed Sept. 4, 1953

INVENTOR.
JOHN S. MICHIE,
BY: Harold B. Hood
ATTORNEY.

United States Patent Office 2,745,291
Patented May 15, 1956

2,745,291

EXPANSIBLE V-PULLEY

John S. Michie, Columbus, Ind., assignor, by mesne assignments, to The Reliance Electric and Engineering Company, Cleveland, Ohio, a corporation of Ohio Application September 4, 1953, Serial No. 378,552

7 Claims. (Cl. 74—230.17)

The present invention relates to variable speed transmissions of the expansibe V-pulley type and is directed particularly to the construction of one of the expansible pulleys used in such a transmission.

In certain applications of such transmissions, once the mechanism has been adjusted for the desired output speed, this adjustment will remain unchanged for long periods of time. When a change in output speed is required, the machine can be shut down in order to make proper adjustments. In such applications, the provision of elaborate mechanisms for the frequent shifting of the expansible V-pulleys is, therefore, unnecessary. It is, therefore, the primary object of this invention to provide a pulley structure for use primarily in such a transmission, which can be manually adjusted, while the machine is shut down, to vary the output speed of the transmission.

It has long been supposed that, in such a transmission, the opposing disc portions of the expansible V-pulleys must be keyed to each other for maximum efficiency. However, where the mechanism is set for a certain output speed and thereafter the adjustment remains unchanged for long periods of time, the axially movable parts of the pulleys will become "frozen" to each other due to the squeezing out of the lubricants, and subsequent shifting of these parts, for adjustment purposes, is then very difficult or impossible. I have found that if the opposing disc portions are left unkeyed for rotation relative to each other, the efficiency of the transmission is in no way reduced, and this "freezing" of the parts is thereby eliminated. It is, therefore, a further object of my invention to provide an expansible V-pulley in which the opposing disc portions are free for relative rotation and in which these portions can be easily and simply adjusted axially, relative to each other, to vary the output speed of the transmission.

Further objects of the invention will become apparent as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
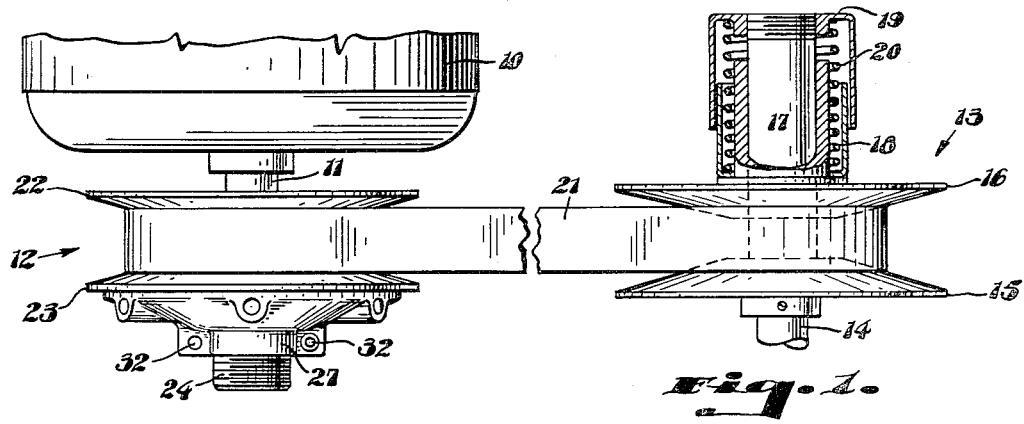
Fig. 1 is a plan view of the type of transmission in which my pulley structure is intended primarily for use.

Referring more particularly to the drawings, it will be seen that I have shown a motor 10 having my improved pulley 11 fixed to the shaft 12 thereof. A resiliently-expansible V-pulley 13 is fixed to a shaft 14 to be driven thereby and comprises a pair of mating coned disc portions 15 and 16. Portion 15 is provided with a stub shaft 17 projecting axially therefrom toward disc portion 16, and the latter is provided with a hub portion 18 sleeved on stub shaft 17. It is particularly to be noted that, in the preferred form of my invention, hub portion 18 is not keyed on stub shaft 17 but is left free for relative rotation thereon.

Stub shaft 17 carries an abutment 19 at its outer end and a coiled spring 20 is confined between this abutment and the disc 16 to urge said disc resiliently toward disc 15. An edge-active belt 21 provides a driving connection between pulleys 12 and 13.

Figures 2, 3:
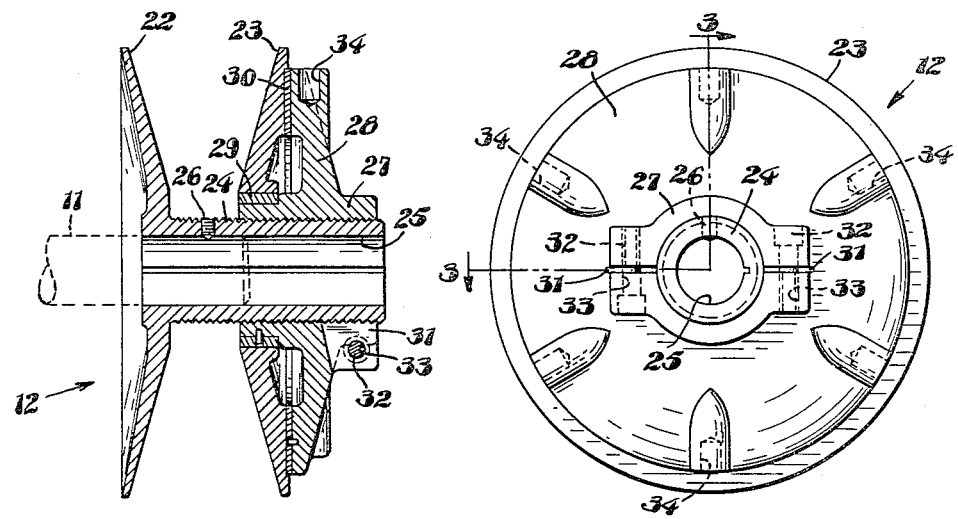
Fig. 2 is an end elevation of a preferred form of my improved pulley structure.
Fig. 3 is a sectional view taken substantially on the line 3—3 of Fig. 2 and showing the details of the pulley.

In Figs. 2 and 3 I have shown a preferred form of my pulley 12 which comprises a pair of relatively axially adjustable coned discs 22 and 23. Disc 22 is provided with a peripherally threaded male hub portion 24 having an axial bore 25 therethrough for reception on motor shaft 11. A set-screw 26, or the like, is provided for fixing disc 22 on shaft 11.

An internally threaded female hub member 27 is threadedly received on hub portion 24 for axial movement toward and away from disc 22 upon relative rotation between hub member 27 and hub portion 24. Said member is provided with a radially-projecting bearing plate 28 and supports an anti-friction bearing 29 on its end adjacent disc 22. Disc 23 is journalled on bearing 29 and engages plate 28 near the outer periphery thereof to prevent axial displacement of disc 23 away from disc 22. A further anti-friction bearing member 30 is preferably interposed between disc 23 and plate 28 near the periphery thereof.

In order to prevent rusting between the threads of the hub portion 24 (which is conventionally formed of a ferrous metal) and the hub member 27, I prefer to form the hub member 27 of some type of non-ferrous metal, such as manganese bronze. This also eliminates the necessity for lubricating the threaded portions thereby reducing the maintenance cost.

To increase the speed of the driven shaft 14, motor 10 is stopped. The adjacent runs of the belt 21 are then squeezed together in order to move disc 16 of pulley 13 away from disc 15. The hub member 27 is then rotated on hub portion 24 to move disc 23 of pulley 12 toward disc 22, and, as this is done, the operator gradually relaxes his grip on the belt runs to permit the belt to move toward the periphery of pulley 12. Such squeezing together of the belt runs is unnecessary when reducing the speed of shaft 14.

Once the proper adjustment is had, some means must be provided to releasably lock hub member 27 against rotation relative to hub portion 24 in order to hold discs 22 and 23 in their proper spacing. I prefer to accomplish this by radially slotting the hub member 27 through the end of said member, as at 31, 31, and passing threaded screws 32, 32 through suitable bores 33, 33 in the member 27 to threadedly engage and clamp the hub member 27 to hub portion 24. Other means such as set screws, or the like, could obviously be employed, but I presently believe the illustrated means to be optimum.

To facilitate the rotation of hub member 27, I prefer to provide a plurality of sockets 34 in the periphery of plate 28 for the reception therein of a tool, such as a simple rod, or a "spanner" wrench, or the like.

Figure 5:
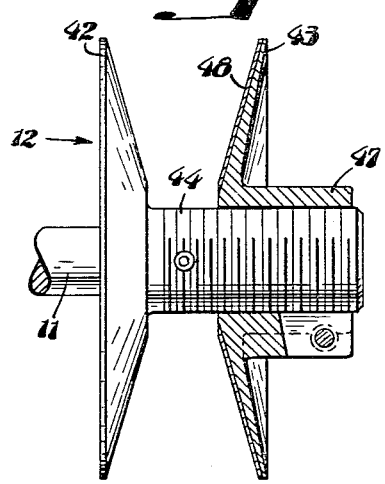
Fig. 5 is a sectional view taken substantially on line 5—5 of Fig. 4 and showing the details of the modified structure of Fig. 4.
Figure 4:
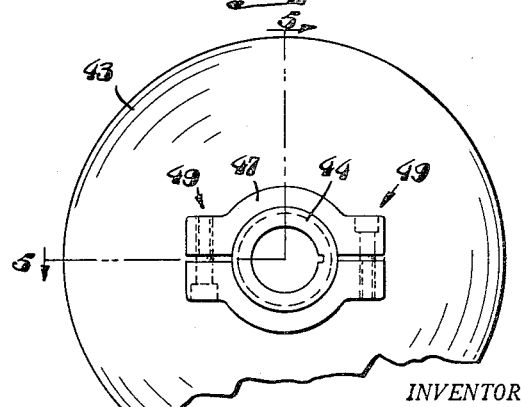
Fig. 4 is a view similar to that of Fig. 2 but showing a modified form of pulley structure.

In Figs. 4 and 5 I have shown a modified form of my pulley 12'. Where it is desired to use the adjustable pulley in combination with a resilient pulley 13 in which the coned disc portions are keyed together in the conventional manner, it is not necessary that the coned disc portions of pulley 12' be relatively rotatable. It is, therefore, possible to simplify somewhat the structure of Figs. 2 and 3, while retaining most of the advantages of that structure.

Pulley 12' comprises a pair of mating coned discs 42 and 43. Disc 42 is provided with a peripherally-threaded male hub portion 44 projecting axially therefrom toward disc 43. Disc 43 is, in turn, provided with an internally-threaded female hub portion 47 retreating axially from said disc away from said disc 42. Hub portion 47 is threadedly received on hub portion 44 and it will be seen that relative rotation between the two hub portions will move disc 43 toward or away from disc 42.

Here, again, in order to prevent rusting between the threads of the hub portions and to eliminate the necessity for lubrication, I prefer to form the disc 43 and the hub portion 47 of a non-ferrous metal such as manganese bronze, or the like. A belt-engaging facing 48 of a ferrous material can then be bonded to the disc face in order to prevent excessive wearing of that face. Means such as the slotted hub and screw arrangement 49 is here again provided to fix hub portion 47 to hub portion 44 once proper adjustment is had between discs 42 and 43.

I claim as my invention:

1. An expansible V-pulley comprising a first coned disc having a peripherally-threaded male hub portion projecting axially therefrom, an internally-threaded female hub member threadedly received on said male hub portion for movement toward and away from said first coned disc upon relative rotation between said hub member and the hub portion of said first coned disc, a second coned disc journalled on said hub member in mating relation with said first coned disc, and means for releasably locking said hub member against rotation relative to said hub portion.

2. The device of claim 1 in which said hub member supports a radially projecting bearing plate on the side of said second coned disc remote from said first coned disc, said second coned disc engaging said bearing plate near the periphery thereof to hold said second coned disc against axial movement away from said first coned disc.

3. The device of claim 2 including anti-friction bearing means interposed between the outer edge of said bearing plate and said second coned disc.

4. A variable speed transmission of the expansible V-pulley type comprising a pair of expansible V-pulleys, and an edge-active belt drivingly connecting together said pulleys, one of said pulleys comprising a pair of mating coned discs free for relative rotation, and means for resiliently urging together said discs, and the other of said pulleys comprising a pair of mating coned discs, one of said discs having a peripherally-threaded male hub portion projecting axially therefrom toward the other of said discs, an internally-threaded female hub member threadedly received on said male hub portion for movement toward and away from said first coned disc upon relative rotation between said hub member and said hub portion, said second coned disc being journalled upon said hub member near the end thereof adjacent said one coned disc for rotation relative thereto, and means for releasably locking said hub member against rotation relative to said hub portion.

5. The device of claim 4 in which said hub portion is formed of a ferrous metal and said hub member is formed of a non-ferrous metal.

6. The device of claim 4 in which said hub member supports a radially projecting bearing plate on the side of said second coned disc remote from said first coned disc, said second coned disc engaging said bearing plate near the periphery thereof to hold said second coned disc against axial movement away from said first coned disc.

7. The device of claim 6 including anti-friction bearing means interposed between the outer edge of said bearing plate and said second coned disc.

References Cited in the file of this patent

UNITED STATES PATENTS

| | | |
|---|---|---|
| 2,101,845 | Fraser | Dec. 14, 1937 |
| 2,229,673 | Rosenfeld | Jan. 28, 1941 |
| 2,254,380 | Mitchell | Sept. 2, 1941 |
| 2,278,739 | Reeves | Apr. 7, 1942 |
| 2,298,535 | Krag | Oct. 13, 1942 |
| 2,447,958 | Mueller | Aug. 24, 1948 |
| 2,635,474 | Hennings | Apr. 21, 1953 |